United States Patent
Campbell et al.

(10) Patent No.: US 7,517,579 B2
(45) Date of Patent: Apr. 14, 2009

(54) TACKIFIED AMORPHOUS-POLY-ALPHA-OLEFIN-BONDED STRUCTURES

(75) Inventors: Stephen Michael Campbell, Winneconne, WI (US); Daniel William Hesse, Neenah, WI (US); Richard D. Schultz, Neenah, WI (US); Mark J. Jung, Menasha, WI (US); Richard M. Hansen, Oshkosh, WI (US); Cristian M. Neculescu, Neenah, WI (US); Sandra Marie Rogers, Appleton, WI (US); Violet May Grube, Greenville, WI (US); Rhiannon L. Thoresen, Appleton, WI (US); Thomas Michael Killian, Sobieski, WI (US); Jonathan K. Rice, Appleton, WI (US); Palani Raj Ramaswami Wallajapet, Neenah, WI (US); Courtney Eileen Shea, Atlanta, GA (US); Jason Sybren Fairbanks, Gainesville, GA (US); Prasad Shrikrishna Potnis, Duluth, GA (US); Randall J. Palmer, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/879,642

(22) Filed: Jul. 18, 2007

(65) Prior Publication Data
US 2007/0264515 A1 Nov. 15, 2007

Related U.S. Application Data

(63) Continuation of application No. 10/701,161, filed on Nov. 4, 2003, now Pat. No. 7,270,889.

(51) Int. Cl.
B32B 5/26 (2006.01)
A61F 13/15 (2006.01)

(52) U.S. Cl. .............. 428/219; 428/102; 428/223; 428/584; 428/594; 442/381

(58) Field of Classification Search ............ 442/328, 442/373, 381, 374; 428/103, 107, 109, 137, 428/214, 219, 102, 223, 99
See application file for complete search history.

(56) References Cited

U.S. PATENT DOCUMENTS 3,338,992 A 8/1967 Kinney (Continued)

FOREIGN PATENT DOCUMENTS

EP 0 217 032 4/1987
JP 01282279 11/1989

OTHER PUBLICATIONS

Satas et al.: *Handbook of Pressure Sensitive Adhesive Technology*, Second Edition, pp. 579 and 582, 1989.
Skeist et al.: *Handbook of Adhesives*, Third Edition, pp. 13 and 576, 1990.

*Primary Examiner*—Lynda Salvatore
(74) *Attorney, Agent, or Firm*—Dority & Manning, P.A.

(57) ABSTRACT

A bonded structure including one or more substrates bonded together with a tackified amorphous poly-alpha-olefin adhesive composition. One method of making such a bonded structure is carried out by applying a tackified amorphous poly-alpha-olefin adhesive composition to one or more substrates at a temperature of about 170 degrees Celsius or lower, and joining the substrates to themselves or to one another. The bonded structure has a dynamic peel strength between about 400 and about 1000 grams per 25 millimeters. The bonding efficiency of the bonded structure renders the bonded structure suitable for incorporation into a variety of articles, including personal care products, health/medical products, and household/industrial product, for example.

20 Claims, 6 Drawing Sheets

U.S. PATENT DOCUMENTS

| | | | |
|---|---|---|---|
| 3,341,394 A | 9/1967 | Kinney |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,340,563 A | 7/1982 | Appel et al. |
| 4,704,116 A | 11/1987 | Enloe |
| 4,749,739 A | 6/1988 | Foster et al. |
| 4,949,668 A | 8/1990 | Heindel et al. |
| 5,336,545 A | 8/1994 | Morman |
| 5,738,669 A | 4/1998 | Suzuki et al. |
| 5,763,333 A * | 6/1998 | Suzuki et al. | 442/351 |
| 5,843,057 A * | 12/1998 | McCormack | 604/367 |
| 5,858,515 A | 1/1999 | Stokes et al. |
| 6,075,179 A | 6/2000 | McCormack et al. |
| 6,605,680 B1 | 8/2003 | Donker et al. |
| 6,627,723 B2 * | 9/2003 | Karandinos et al. | 526/348 |
| 6,632,212 B1 | 10/2003 | Morman et al. |
| 6,638,636 B2 | 10/2003 | Tucker |
| 6,657,009 B2 | 12/2003 | Zhou |
| 6,833,404 B2 | 12/2004 | Quinn et al. |
| 2002/0124956 A1 | 9/2002 | Zhou et al. |
| 2003/0096896 A1 | 5/2003 | Wang et al. |
| 2005/0054779 A1 | 3/2005 | Zhou et al. |

* cited by examiner

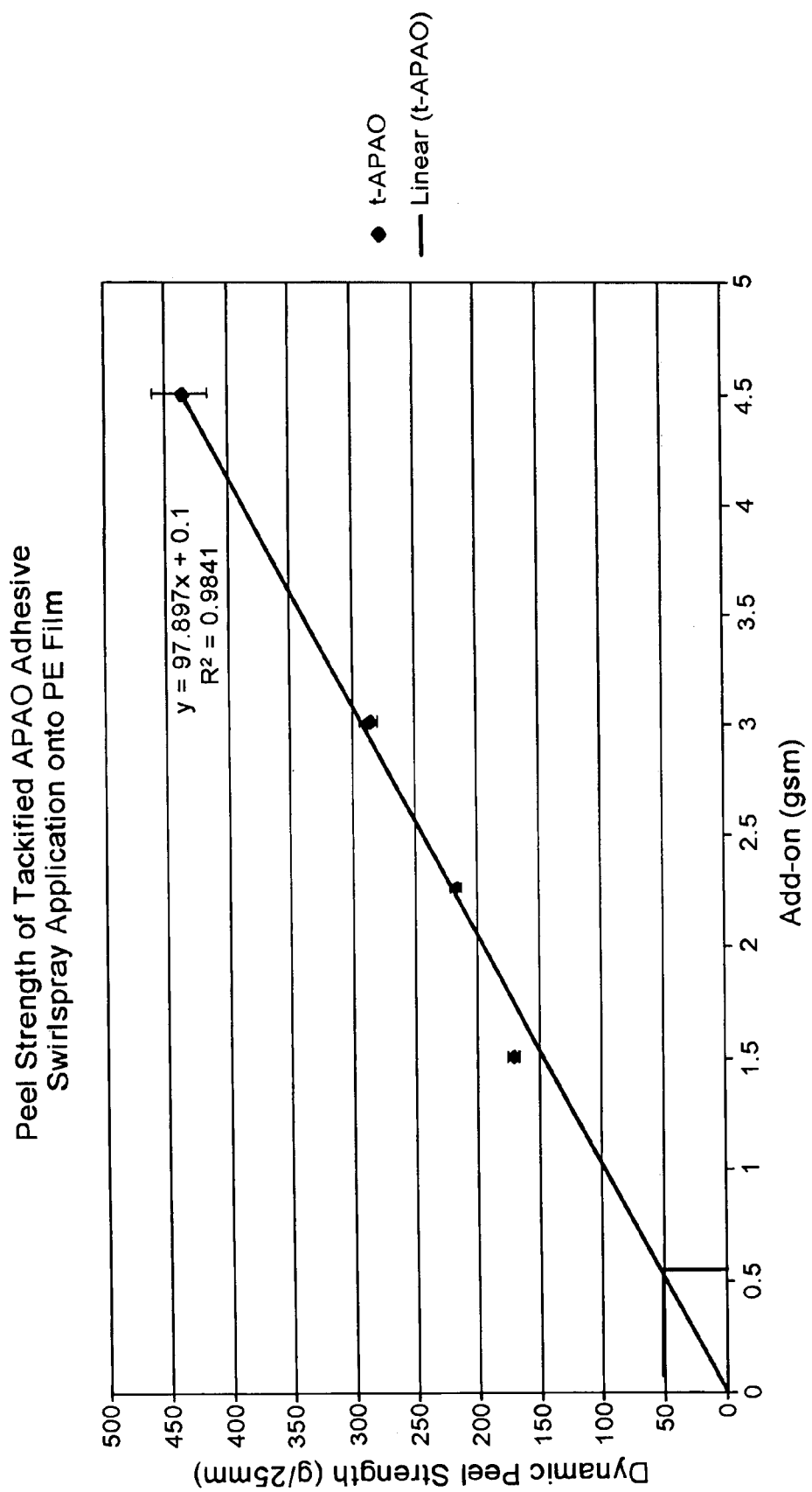

TACKIFIED AMORPHOUS-POLY-ALPHA-OLEFIN-BONDED STRUCTURES

This application is a continuation of prior application Ser. No. 10/701,161 filed 4 Nov. 2003 now U.S. Pat. No. 7,270,889. The entire teachings of application Ser. No. 10/701,161 are hereby incorporated by reference.

BACKGROUND OF THE INVENTION

Bonded structures are incorporated into a variety of articles, including personal care products, medical garments, and industrial workwear garments, for example. Also, quite often, one or more components of an article are adhesively bonded together. For example, adhesives have been used to bond individual layers of an absorbent article, such as a topsheet (also known as, for example, the body-side liner) and backsheet (also known as, for example, the outer cover), together. Adhesives are also used to bond discrete pieces, such as fasteners and leg elastics, to the article.

Styrene block copolymer adhesives are often used to bond various materials to create bonded structures. Amorphous poly-alpha-olefin adhesives have been shown to provide slightly improved bond strengths relative to styrene block copolymer adhesives, particularly when bonding polypropylene film substrates. While the bond strengths of styrene block copolymer adhesives and amorphous poly-alpha-olefin adhesives may be sufficient for some uses, bond failure remains a problem in a number of applications.

In personal care products, such as diapers, bond strength is particularly important in the waist region and around the leg openings. These areas of disposable garments are exposed to considerable tension while the garments are being applied to or removed from a wearer, as well as while the garment is in use on a wearer. Consequently, the bonded structures in the waist region and leg openings of such garments are highly susceptible to bond failure. If bond failure between a topsheet and a backsheet occurs in the waist region, in particular, there is a likelihood that absorbent material positioned between the topsheet and the backsheet may escape from the garment, thereby causing a mess.

Bonding efficiency of adhesives requires adequate product bonding while minimizing such concerns as adhesive bleed-through, roll-blocking, machine contamination, and susceptibility to substrate deformation with hot-melt adhesives. Balancing these factors along with other factors such as cost is difficult. Additionally, it is difficult to achieve a bonded structure having sufficient bond strength when the structure includes certain substrates, such as polyethylene substrates or other low-energy olefin-surfaced substrates.

Burn-through is another potential problem that may occur during lamination or bonding processes. Preventive steps for avoiding burn-through typically include process changes such as reducing the adhesive add-on level, adjusting the temperature, installing new adhesive nozzles, adjusting a nozzle distance, or other processing changes. While effective in reducing burn-through, a reduced adhesive amount can have negative consequences on bond strength, and other process changes can be unrealistic due to adhesive rheology, high capital expenditures or lengthy machine down time.

There is a need or desire for a bonded structure having sufficient bond strength, particularly when the bonded structure includes one or more low-energy olefin-surfaced substrates. There is a further need or desire for a bonded structure that possesses sufficient bond strength that can be formed with minimal or no burn-through and without requiring process changes. There is yet a further need or desire for a cost-efficient bonded structure having sufficient bond strength. There is still a further need or desire for a personal care garment including one or more bonded structures or bonded components having sufficient bond strength.

SUMMARY OF THE INVENTION

The present invention is directed to bonded structures in which one or more substrates or components is bonded with a tackified amorphous poly-alpha-olefin adhesive composition. The invention also includes articles including such bonded structures, and methods of making these bonded structures.

The bonded structures of the invention exhibit improved strength at lower adhesive add-on levels compared to structures bonded with neat amorphous poly-alpha-olefin or styrene block copolymer adhesives, with the bonded structures of the invention having a dynamic peel strength between about 40 and about 1000 grams per 25 millimeters. Additionally, the bonded structures suitably have a compression-tensile peel strength between about 80 and about 400 grams per square millimeter. Since the adhesive add-on levels of the bonded structures can be lower than adhesive add-on levels of similar bonded structures using other adhesives, and still result in improved strength, the bonded structures of the invention can be produced at a lower cost due to material cost-savings.

The adhesive composition that bonds the substrates together may include between about 50% and about 99% by weight amorphous poly-alpha-olefin, between about 1% and about 50% by weight tackifier, and about 1% or less by weight antioxidant stabilizer. The amorphous poly-alpha-olefin may be propylene copolymerized with butene, ethylene, and/or hexene, such as polypropylene-1-butene amorphous poly-alpha-olefin random copolymer, for example. The tackifier suitably has a molecular weight of about 2000 or less, and may include one or more hydrocarbons, such as a saturated C5 hydrocarbon tackifier, and/or other hydrocarbons such as petroleum distillates, rosin, rosin esters, polyterpenes derived from wood, polyterpenes derived from synthetic chemicals, or a combination of any of these. The adhesive composition may be applied to the substrates at an add-on level between about 0.5 and about 25 grams per square meter. The adhesive composition may be applied to very thin substrates, such as those having a thickness of about 40 µm or less, without resulting in significant film burn-through.

The substrates in the bonded structure may be two separate substrates, or may be a single substrate that is folded and bonded to itself. Additionally, the substrates may be composed of the same type of material or different types of material. Examples of suitable substrates include nonwoven materials, woven materials, films, elastic components, fastening components, or any combination of these materials, formed of cellulosic material, thermoplastic material, or any other type of material. In particular embodiments, the substrates may include a low-surface-energy olefin substrate, such as a polyethylene layer, a polypropylene layer, or a combination of polyethylene and polypropylene layers.

More specific examples of suitable substrate materials include necked-bonded laminates, stretch-bonded laminates, spunbond-meltblown-spunbond laminates, spunbond materials, or a combination of any of these materials. Substrate materials may be liquid-permeable, or liquid-impermeable, yet water-vapor-transmissible. Additionally, the substrate materials may be extensible or non-extensible, or elastomeric. Examples of suitable elastomeric materials include elastomeric polymer compositions, which may include tackified polymers, olefinic copolymers, polyethylene elastomers, polypropylene elastomers, polyester elastomers, ethylene-propylene-diene terpolymers, styrene-isoprene-styrene, styrene-butadiene-styrene, styrene-ethylene/butylene-styrene, styrene-ethylene/propylene-styrene, polyurethane, polyisoprene, cross-linked polybutadiene, or a combination of any of these polymeric materials. In certain embodiments, at least one substrate may include a low-tension elastic material.

The bonded structures are suitable for use in a variety of articles including, but not limited to, personal care products, health/medical products, household/industrial products, and the like.

One method of making the bonded structures includes applying the tackified amorphous poly-alpha-olefin adhesive composition at a temperature of 170 degrees Celsius or lower to at least one of the substrates, and joining at least a portion of each substrate to one another with at least a portion of the applied adhesive composition positioned between the substrates or substrate portions. The Brookfield viscosity of the adhesive composition may be between about 1000 and about 15000 centipoise at 190 degrees Celsius, spindle 27. The adhesive composition may be applied using any suitable technique, such as melt-spraying, slot-coating, or a swirl-spraying, for example.

With the foregoing in mind, it is a feature and advantage of the invention to provide bonded structures, and methods of making such bonded structures, having improved bond strength at a lower cost compared to similar bonded structures bonded with neat amorphous poly-alpha-olefin or styrene block copolymer adhesive compositions.

BRIEF DESCRIPTION OF THE DRAWINGS

These and other objects and features of this invention will be better understood from the following detailed description taken in conjunction with the drawings, wherein:

FIG. 6 shows a graph of dynamic peel strength as a function of adhesive add-on level for the data in Example 2.

DEFINITIONS

Figure 1:
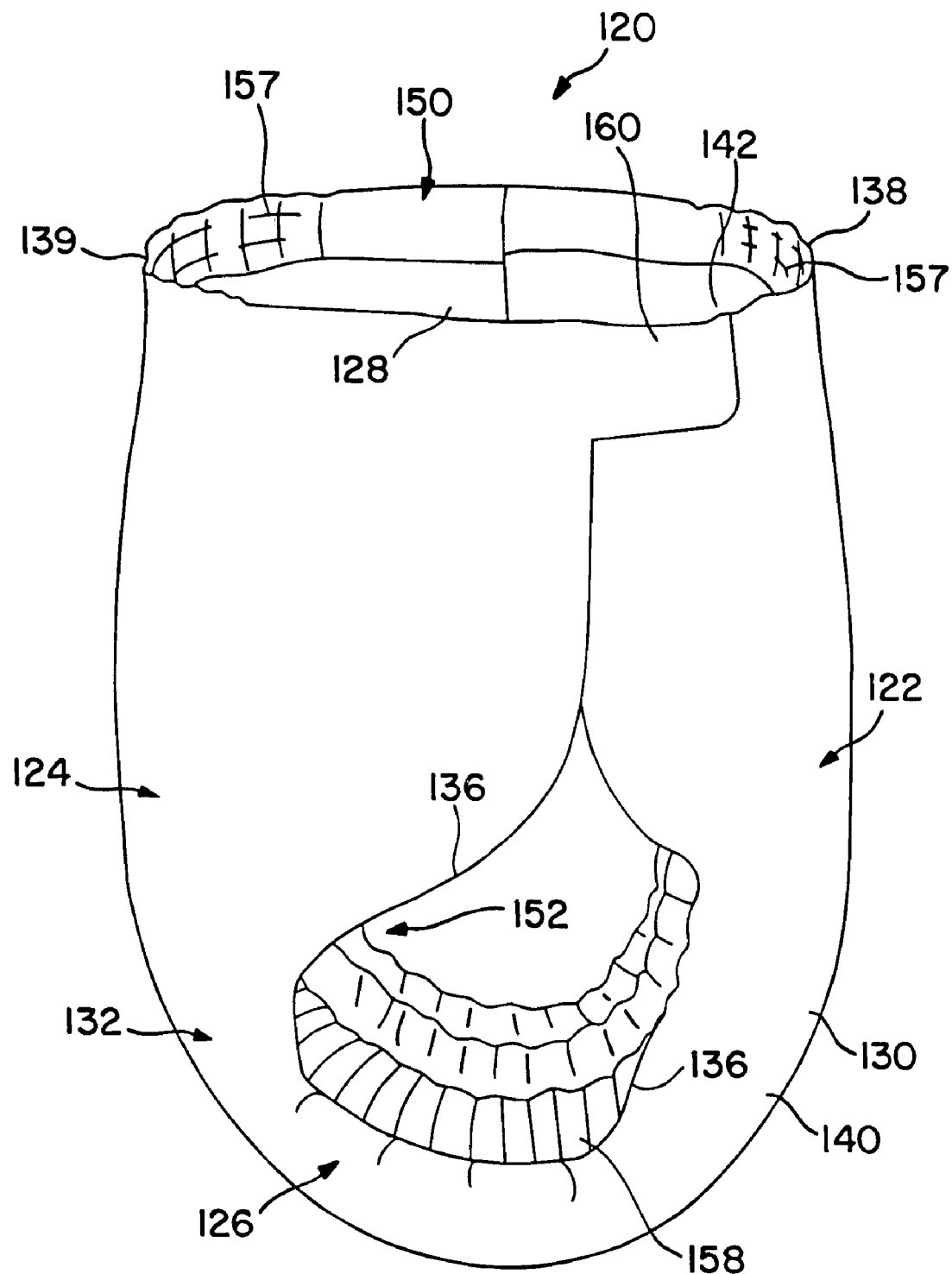
FIG. 1 is a perspective view of an article including at least one bonded structure.

Within the context of this specification, each term or phrase below will include the following meaning or meanings.

"Article" includes personal care products, health/medical products, household/industrial products, and the like.

"Bonded" refers to the joining, adhering, connecting, attaching, or the like, of at least two elements. Two elements will be considered to be bonded together when they are bonded directly to one another or indirectly to one another, such as when each is directly bonded to intermediate elements.

"Bonded structure" includes layers, laminae, or other components bonded together, at least in part, by an adhesive binder. A single layer, material, component, web, or substrate may be folded over and adhesively bonded to itself to form a "bonded structure."

"Elastomeric" and "elastic" are used interchangeably to refer to a material or composite that is generally capable of recovering its shape after deformation when the deforming force is removed. Specifically, as used herein, elastic or elastomeric is meant to be that property of any material which, upon application of a biasing force, permits the material to be stretchable to a stretched biased length which is at least about 50 percent greater than its relaxed unbiased length, and that will cause the material to recover at least 40 percent of its elongation upon release of the stretching force. A hypothetical example which would satisfy this definition of an elastomeric material would be a one (1) inch sample of a material which is elongatable to at least 1.50 inches and which, upon being elongated to 1.50 inches and released, will recover to a length of less than 1.30 inches. Many elastic materials may be stretched by much more than 50 percent of their relaxed length, and many of these will recover to substantially their original relaxed length upon release of the stretching force.

"Extensible" means that a material can be stretched, without breaking, by at least 50% (to at least 150% of its initial (unstretched) length) in at least one direction, suitably by at least 100% (to at least 200% of its initial length), desirably by at least 150% (to at least 250% of its initial length). The term includes elastic materials as well as materials that stretch but do not significantly retract. A hypothetical example which would satisfy this definition of an extensible material would be a one (1) inch sample of a material which is elongatable by at least 50% to at least 1.50 inches.

"Film" refers to a thermoplastic film made using a film extrusion process, such as a cast film or blown film extrusion process or extrusion coating. The term includes apertured films, slit films, and other porous films which constitute liquid transfer films, as well as films which do not transfer liquid. The term also includes thermoplastic films that can be converted in process or post-process to thermoset films.

"Health/medical products" include products for applying hot or cold therapy, medical gowns (i.e., protective and/or surgical gowns), surgical drapes, caps, gloves, face masks, bandages, wound dressings, wipes, covers, containers, filters, disposable garments and bed pads, medical absorbent garments, underpads, and the like "Hot-melt processable" means that an adhesive composition may be liquefied by heating (i.e., using a hot-melt tank or other system in which the composition is heated so that it is substantially in liquid form) and transported via a pump (e.g., a gear pump or positive-displacement pump or a screw device) from a tank to the point of application proximate to a substrate or other material; or to another tank, system, or unit operation (e.g., a separate system, which may include an additional pump or pumps, for delivering the adhesive to the point of application).

"Household/industrial products" include construction and packaging supplies, products for cleaning and disinfecting, wipes, covers, filters, towels, bath tissue, facial tissue, nonwoven roll goods, home-comfort products including pillows, pads, cushions, masks and body care products such as products used to cleanse or treat the skin, laboratory coats, coveralls, and the like.

"Laminate" is a subset of the term "bonded structure." In particular, a laminate includes substrates, such as paper, woven fabrics, nonwoven webs, or films, which are readily available in continuous-sheet form.

"Layer" when used in the singular can have the dual meaning of a single element or a plurality of elements.

"Liquid-impermeable" when used to describe a layer or laminate means that liquid such as water or bodily fluids will not pass through the layer or laminate under ordinary use conditions in a direction generally perpendicular to the plane of the layer or laminate at the point of liquid contact.

"Liquid-permeable" refers to a layer or laminate that is not liquid-impermeable.

"Low-surface-energy olefin substrate" refers to a material having a surface tension of about 33 dynes/cm or less, as measured using a Dynes test.

"Low-tension elastic material" refers to a material that provides about 200 grams per inch or less, or about 100 grams per inch or less, or about 50 grams per inch or less, of force when it is elongated 20%.

"Meltblown fiber" refers to fibers formed by extruding a molten thermoplastic material through a plurality of fine, usually circular or rectangular, die capillaries as molten threads or filaments into converging high velocity gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface.

"Non-extensible" means that a material is not extensible as defined herein.

"Nonwoven" and "nonwoven web" refer to materials and webs of material having a structure of individual fibers or filaments which are interlaid, but not in an identifiable manner as in a knitted fabric. The terms "fiber" and "filament" are used herein interchangeably. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

"Personal care products" include absorbent articles such as diapers, diaper pants, baby wipes, training pants, absorbent underpants, child care pants, swimwear, and other disposable garments; feminine care products including sanitary napkins, wipes, menstrual pads, menstrual pants, panty liners, panty shields, tampons, and tampon applicators; adult-care products including wipes, pads, containers, incontinence products, and urinary shields; clothing components; and athletic and recreation products.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible configurational isomers of the material. These configurations include, but are not limited to isotactic, syndiotactic and atactic symmetries.

"Spunbond fiber" refers to small diameter fibers which are formed by extruding molten thermoplastic material as filaments from a plurality of fine capillaries of a spinnerette having a circular or other configuration, with the diameter of the extruded filaments then being rapidly reduced as taught, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein by reference in its entirety in a manner consistent with the present document. Spunbond fibers are quenched and generally not tacky when they are deposited onto a collecting surface. Spunbond fibers are generally continuous and often have average deniers larger than about 0.3, more particularly, between about 0.6 and 10.

"Strand" refers to an article of manufacture whose width is less than a film and is suitable for incorporating into a film, according to the present invention.

"Substrate" when used in the singular can have the dual meaning of a single layer or a plurality of layers such as in a laminate.

"Tackifier" refers to resins that are added to base polymers/ elastomers in adhesives to improve the tack (ability to stick). This is achieved mostly by better wetting out onto a surface and improved specific adhesion.

"Thermoplastic" describes a material that softens and flows when exposed to heat and which substantially returns to a nonsoftened condition when cooled to room temperature.

"Thermoset" describes a material that is capable of becoming permanently cross-linked, and the physical form of the material cannot be changed by heat without the breakdown of chemical bonds.

"Visual defect" refers to a surface imperfection, such as a hole or merely a non-smooth surface area, or pitting, that can be viewed with or without magnification.

"Water-vapor-transmissible" or "breathable" refers to a film or other substrate having a water vapor transmission rate ("WVTR") of at least about 500 grams/$m^2$-24 hours, using the WVTR Test Procedure described in U.S. Pat. No. 6,638,636 issued to Tucker, which is hereby incorporated by reference in its entirety in a manner consistent with the present document. Breathable materials typically rely on molecular diffusion of vapor, or vapor passage through micropores, and are substantially liquid-impermeable.

"Woven" fabric or web means a fabric or web containing a structure of fibers, filaments, or yarns, which are arranged in an orderly, inter-engaged fashion. Woven fabrics typically contain inter-engaged fibers in a "warp" and "fill" direction. The warp direction corresponds to the length of the fabric while the fill direction corresponds to the width of the fabric. Woven fabrics can be made, for example, on a variety of looms including, but not limited to, shuttle looms, rapier looms, projectile looms, air jet looms, and water jet looms.

These terms may be defined with additional language in the remaining portions of the specification.

DESCRIPTION OF PREFERRED EMBODIMENTS

In accordance with the invention, tackified amorphous poly-alpha-olefin-bonded structures are provided for use in a variety of articles. A method of making these bonded structures is also provided.

Increased bonding efficiency with adhesives is critical to providing adequate product bonding while minimizing process application and product concerns, such as adhesive bleed-through, roll-blocking, machine contamination, and substrate susceptibility to deformation with hot-melt adhesives. The bonded structures described herein are efficiently bonded with tackified amorphous poly-alpha-olefin (APAO) at relatively low add-on levels and at relatively low temperatures, thereby avoiding these concerns and others. Additionally, the resulting bonded structures may have reduced product stiffness compared to similar bonded structures bonded with neat APAO or styrene block copolymer adhesive compositions.

A bonded structure of the invention includes two or more substrates bonded together with a tackified APAO adhesive composition. More particularly, the adhesive composition includes an APAO in an amount between about 50% and about 99%, or between about 70% and about 95%, or between about 80% and about 85% by weight of the adhesive composition. Examples of suitable APAO polymers include propylene copolymerized with butene, ethylene, and/or hexene. Two particularly suitable neat APAO are polypropylene-1-butene APAO random copolymers, such as RT2730 or RT2723, both available from Huntsman Polymers Inc. of Odessa, Tex.

The adhesive composition also may include a tackifier in an amount between about 1% and about 50%, or between about 5% and about 30%, or between about 15% and about 20% by weight of the adhesive composition. In contrast with the APAO, the tackifier has a low molecular weight, suitably about 2000 Daltons or less. Examples of suitable tackifiers include fully or substantially saturated (e.g. hydrogenated) C5 resins, derived from isoprene or di-cyclopentadiene (DCPD). Other suitable tackifiers include hydrocarbons derived from petroleum. distillates, rosin, rosin esters, hydrogenated rosin esters, polyterpenes derived from wood, polyterpenes derived from synthetic chemicals, as well as combinations of any of these. A commercially available example of a suitable tackifier is ESCOREZ™ 5340 tackifier, available from Exxon-Mobil. ESCOREZ™ 5340 has a softening point of 140 degrees Celsius and viscosity of 5000 cps at 177 degrees Celsius. Another suitable tackifier, ESCOREZ™ 5320, has a softening point of 122 degrees Celsius, and a relatively low viscosity of 1500 cps at 177 degrees Celsius. Yet another suitable tackifier, ESCOREZ™ 5415, has a softening point of 118 degrees Fahrenheit, and a lower viscosity of 900 cps at 177 degrees Celsius. Additionally, the adhesive composition may include an antioxidant stabilizer, suitably in an amount sufficient for maintaining the desired properties of adhesives. Sufficient amounts of antioxidant stabilizer would be apparent to one skilled in the art. For example, the adhesive composition may include an antioxidant stabilizer in an amount of about 1% or less by weight of the adhesive composition. One example of a suitable antioxidant is available from Ciba Specialty Chemicals under the trade designation IRGANOX™ 1010.

The tackified APAO adhesive composition has a longer open time than neat APAO. The term "open time," as used herein, refers to the length of time during which an adhesive composition remains tacky or sticky prior to becoming solid. More particularly, open time is measured from the time the adhesive leaves the applicator to the time it solidifies on a substrate. Solidification is determined as the point at which the adhesive is no longer capable of making an effective bond to another substrate. Thus, the tackified APAO adhesive composition provides time for adjustments, and allows adjustments to be made, during the open time, but generally sets to a low or non-tacky state at use temperature.

The tackified APAO adhesive composition may consist wholly or essentially of APAO and tackifier, with a minor amount of antioxidant. Alternatively, one or more additives may be present in the adhesive composition in an amount of about 20% or less by weight of the adhesive composition. These additives may include a plasticizer, color pigment or dye, fragrance, filler, a polymer compatibilizer, and/or a low softening point additive. The adhesive composition may include any one or more of these additives. Examples of suitable color pigments and fillers include $TiO_2$, carbon black, and calcium carbonate. Examples of suitable polymer compatibilizers include polypropylene-b-polyethylene, polypropylene-b-polybutene diblock copolymers. Additionally, one or more viscosity modifiers can be added to the adhesive composition. Examples of suitable viscosity modifiers include waxes, oils, low molecular weight polymers, and other viscosity modifiers known to those skilled in the art.

A low softening point additive typically has a softening point below about 80 degrees Celsius and a viscosity of about 1000 cps or less at 360 degrees Fahrenheit (182 degrees Celsius). The inclusion of relatively low amounts of low softening point additives provides instantaneous surface tackiness and pressure sensitive characteristics as well as reduced melt viscosity. Suitably, the low softening point additive is present in the composition in an amount between about 0% and about 20%, or between about 0% and about 10% by weight of the composition. Examples of suitable low softening point additives include waxes and mineral oils.

The adhesive composition may typically be processed and applied using conventional hot-melt adhesive processing equipment. Generally it is possible to use existing adhesive application equipment. It should be understood, however, that the invention encompasses tackified APAO-bonded structures, whether or not the structures possess all of the advantages discussed herein.

Bonded structures of the invention may be formed by applying the above-described tackified APAO adhesive composition to one or more substrates at a temperature of about 170 degrees Celsius or less, suitably between about 120 and about 170 degrees Celsius, or between about 140 and about 160 degrees Celsius. Brookfield viscosity of the tackified APAO adhesive composition is suitably in the range of about 1000 to about 15000 centipoise at 190 degrees Celsius, spindle 27. This level of viscosity enables the adhesive composition to be readily processed by conventional hot melt equipment. As mentioned, however, some tackified APAO adhesive compositions in the invention may not possess this particular advantage.

The tackified APAO adhesive composition may be applied to the substrates using any suitable application technique known in the art, such as melt-spraying. Tackified APAO adhesive compositions used in the bonded structures of the invention can be applied at a lower add-on level and yet achieve greater bond strength than bonded structures bonded with either neat APAO or styrene block copolymer (SBC) adhesive compositions, as shown in the Examples below. More particularly, the tackified APAO adhesive composition can be applied by swirl-spraying, melt-spraying, or slot-coating to the substrates at an add-on level between about 0.5 and about 25 grams/meter$^2$ (gsm), or between about 0.75 and about 20 gsm, or between about 1 and about 15 gsm, or between about 2 and about 5 gsm. The appropriate add-on level varies depending on the method of application. For example, melt-spraying and swirl-spraying applications result in a lower add-on level, such as between about 1 and about 5 gsm, whereas slot-coating applications result in comparatively higher add-on levels, such as between about 10 and about 15 gsm, for example.

Once the tackified APAO adhesive composition is applied to one or more substrates, at least a portion of one substrate is joined to at least a portion of another substrate, such that at least a portion of the applied adhesive composition is positioned between the two substrates.

The resulting bonded structure has considerable bond strength, quantified by a dynamic peel strength of at least 40 grams per 25 millimeters, or between about 40 and about 1000 grams per 25 millimeters, or between about 60 and about 600 grams per 25 millimeters. The test method for determining Dynamic Peel Strength is described in detail below. Example 1 below provides a comparison of bond strength among tackified APAO, APAO, and SBC adhesive compositions. The composition of the substrate, or at least the composition of the surface of the substrate that contacts the adhesive composition, is a key factor in the peel strength of the bonded structure of the invention. Examples of suitable substrates are described below in detail. In particular, it has been found that tackified APAO exhibits a 20-30% increase in bond strength on polypropylene-surfaced substrates compared to both neat APAO and SBC adhesive compositions. Even more surprising, it has been discovered that tackified APAO exhibits a remarkable 40-100% increase in bond strength on polyethylene-surfaced substrates compared to both neat APAO and SBC adhesive compositions. These results were particularly surprising in view of the fact that neat APAO does not function well with polyethylene.

Because the bond strength of tackified APAO is greater than the bond strength of APAO and SBC adhesive compositions, a lower add-on level of tackified APAO is required compared to APAO and SBC adhesive compositions. The cost of APAO is generally less than the cost of SBC, and the cost of using tackified APAO in the bonded structures of the invention is even less than the cost of using neat APAO to form similar bonded structures because of the reduced amount of adhesive required to achieve sufficient bond strength. Thus, the bonded structures of the invention have greater bond strength at a lower manufacturing cost than conventional bonded structures.

Corona treatment is often applied to films to change the surface tension for improved adhesion. However, with the tackified APAO adhesive composition, corona treatment is not required to build acceptable peel strength in the bonded structures of the invention, thereby achieving even greater cost savings compared to similar bonded structures.

A compression/tensile test instrument, known as a Texture Analyzer, was used to define methods to generate adhesive bonds in a controlled manner and to test the strength of the resulting bonds. One example of a suitable Texture Analyzer is manufactured by Stable Microsystems, England. Conditions chosen for inter adhesive/film comparisons were established to generate a maximum potential attachment between the film substrate and the adhesive by placing a 0.025 mm (1 mil) thick layer of adhesive and the film under sufficient compressive force (pressure) to indent the film-coated probe into the adhesive by 0.0025 mm (0.1 mil) for 40 seconds. Subsequently, the film surfaced probe was extracted from the adhesive. Force, energy, and distance to complete the separation of the film from adhesive were measured. This test method was designed to generate the strongest bonding possible through high pressure and long contact times. It was found that the 0.1 mil indentation gives adequate wetting of the film without getting adhesive onto the sides of the probe. This methodology minimizes some of the influence normally experienced by high-speed processing, thus providing a measurement that is semi-independent of processing. The tackified APAO adhesive composition in the bonded structures of the invention suitably has a compression-tensile peel strength between about 80 and about 400, or between about 85 and about 250, or between about 88 and about 125 grams per square millimeter, or at least 5%, or at least 10%, or at least 20% greater than the compression-tensile peel strength of the same bonded structure including neat APAO in lieu of the tackified APAO adhesive composition. A comparison of compression-tensile peel strengths among tackified APAO, APAO, and SBC adhesive compositions is provided in Example 1 below. The compression-tensile data in Example 1 correlates well to data derived by lamination, which shows that the lamination work was conducted in such a way as to minimize processing influences on bonding.

The two substrates in the bonded structure may be two separate pieces of material, or each may be part of a single piece of material folded over and bonded to itself. Furthermore, one or both substrates may include a variety of materials, including, but not limited to a nonwoven (e.g., a spunbond or meltblown material, or a combination of nonwoven materials such as spunbond-meltblown-spunbond laminates or necked-bonded laminates, or carded, wet-laid, hydroentangled, or a combination of any of these materials); a film; a foam; a woven material; an elastic component; fastener material; a substrate including cellulosic material, materials containing natural fibers, thermoplastic material, or both; some combination of these; even a combination of melt-incompatible materials; or the like. For example, the substrates may each include a spunbond web having a basis weight of about 0.1 to about 4.0 ounces per square yard (osy), suitably about 0.2 to about 2.0 osy, or about 0.4 to about 1.0 osy. The substrates may include the same or similar materials or different materials. In particular, the substrates may include a low-surface-energy olefin substrate, such as a polyethylene layer, a polypropylene layer, or a polyester layer, or a combination of any of these layers. As used herein, the term "low-surface-energy olefin substrate" refers to a material having a surface tension of about 33 dynes/cm or less, as measured using a Dynes test. Untreated films of polyethylene typically have a surface tension of 30-31 dynes/cm, while untreated films of polypropylene typically have a surface tension of 28-31, as noted in *Handbook of Adhesives, Third Edition*, edited by Irving Skeist, Van Nostrand Reinhold, 1990, and in *Handbook of Pressure Sensitive Adhesive Technology, Second Edition*, edited by Donatas Satas, Van Nostrand Reinhold, 1989. Films are often treated, such as by corona treatment, to increase the surface tension in order to render the film conducive to bonding with a standard adhesive. As used herein, the term "polyester" includes synthetic polymers produced chiefly by reaction of dibasic acids with dihydric alcohols, including polyethylene terephthalate, polybutylene terephthalate, and polylactic acid, for example.

Substrate materials may be liquid-impermeable, yet water-vapor-transmissible. Additionally, the substrate materials may be extensible or non-extensible, or elastomeric. Extensible substrates, such as necked-bonded laminates (NBL), stretch-bonded laminates (SBL), and point unbonded materials, can be incorporated into the bonded structures of the invention. For additional detail on how NBLs and other neck-bonded materials are formed, see U.S. Pat. No. 5,336,545 to Morman, entitled "Composite Elastic Necked-Bonded Material," which is hereby incorporated by reference in its entirety in a manner consistent with the present document. An SBL is generally a laminate made up of an elongated elastic web or elongated elastomeric strands bonded between two spunbond layers, for example. For additional detail on how SBLs are formed, see European Patent Application No. EP 0 217 032 published on Apr. 8, 1987 in the names of Taylor et al., which is hereby incorporated by reference in its entirety in a manner consistent with the present document. Point unbonded materials are fabrics having continuous thermally bonded areas defining a plurality of discrete unbonded areas and are described in greater detail in U.S. Pat. No. 5,858,515 issued Jan. 12, 1999 to Stokes, et al., hereby incorporated by reference in its entirety in a manner consistent with the present document.

Examples of suitable elastomeric materials include elastomeric polymer compositions, tackified polymers, olefinic copolymers, polyethylene elastomers, polypropylene elastomers, polyester elastomers, ethylene-propylene-diene terpolymers, styrene-isoprene-styrene, styrene-butadiene-styrene, styrene-ethylene/butylene-styrene, styrene-ethylene/propylene-styrene, polyurethane, polyisoprene, cross-linked polybutadiene, or a combination of any of these materials. As used herein, the term "polyester elastomer" includes polyester amide, polyester ether urethane, polyether amide, and polyether urethane. One example of a commercially available polyester elastomer is PEBAX® polyether block amide, available from ATOFINA Chemicals Inc. of Philadelphia, Pa. Another commercially available polyester elastomer is HYTREL®, available from E.I. Du Pont de Nemours of Wilmington, Del. In certain embodiments, at least one substrate may include a low-tension elastic material. The substrates may be in sheet form, or may be in forms other than sheet form, such as strands, individual fasteners or decorations, or the like.

As mentioned, at least one substrate within the bonded structure may include fastener material or a fastening component. For example, a substrate may include hook material or loop material as used in hook-and-loop fasteners. Hook material typically includes a base or backing structure and a plurality of hook members extending outwardly from at least one surface of the backing structure. In contrast to loop material, which is typically a flexible fabric, hook material advantageously includes a resilient material to minimize unintentional disengagement of the hook members as a result of the hook material becoming deformed and catching on clothing or other items. The term "resilient" as used herein refers to an interlocking material having a predetermined shape and the property of the interlocking material to resume the predetermined shape after being engaged and disengaged from a mating, complementary interlocking material. Suitable hook material can be molded or extruded of nylon, polypropylene, or other suitable material. Examples of commercially available hook material are available from Velcro Industries B.V., Amsterdam, Netherlands or affiliates thereof, as well as from Minnesota Mining & Manufacturing Co., St. Paul, Minn., U.S.A., or from Aplix Corporation of Charlotte, N.C., U.S.A.

The adhesive composition may be applied to very thin substrates, such as those having a thickness of about 40 μm or less, or between about 5 and about 25 μm, or between about 10 and about 20 μm, without resulting in significant film burn-through. As mentioned, the tackified APAO adhesive composition can be applied to the substrates at a temperature of about 170 degrees Celsius or less. It has been discovered that lower application temperatures for the tackified APAO adhesive composition result in improved bond strength compared to neat APAO. This discovery is counter-intuitive to standard adhesive application processes, wherein better bond strength is typically achieved through an increase in application temperature. Because the tackified APAO adhesive composition can be applied at lower temperatures, and because the add-on level of the adhesive composition is low compared to conventional adhesive add-on levels, there is a reduced likelihood of creating film pitting or burn-through as often occurs in conventional adhesive and ultrasonic application processes.

Film burn-through can be qualitatively measured visually, or in certain cases can be measured quantitatively using a hydrohead test. The bonded structures of the invention have such little or no burn-through that the bonded structures suitably have no burn-through visual defects larger than about 1 millimeter. A qualitative burn-through rating system is described in detail in the Test Methods section below. In certain embodiments, the bonded structures of the invention suitably have a burn-through rating of about 3 or less (meaning less than 1 mm film deformations), as determined by the burn-through rating system described below.

While it is desirable, or necessary, to avoid burn-through, it is equally necessary, or desirable, to achieve sufficient end seal strength at the same time. To reduce burn-through, the adhesive amount is often reduced. However, the amount of adhesive used must be great enough to provide sufficient bond strength. Example 2, below, illustrates the wide range of adhesive add-on levels of tackified APAO that provide sufficient peel strength without causing unacceptable levels of burn-through on thin, heat-sensitive films. In contrast, as illustrated in Example 2, neat APAO could not simultaneously achieve acceptable end seal strength without causing unacceptable levels of burn-through at any add-on level with the same substrates. End seal strength is a measure of both the cohesive and adhesive strength of the outer cover to the body side liner of absorbent products such as diapers using a constant rate of extension tensile tester. A test method for determining end seal strength is described in detail below. Suitably, the bonded structures of the invention, when incorporated into an article, have an end seal strength between about 40 and about 1000 grams per 25 millimeters, or between about 60 and about 600 grams per 25 millimeters.

Other options for reducing or eliminating adhesive burn-through of film components include processing changes, such as the installation of new adhesive nozzles, adjusting the nozzle distance, adjusting the processing temperatures, adjusting, replacing, or adding chill rolls, and the like. Although these process changes may be effective, such process changes are also often unrealistic due to high capital expenditures (i.e., chill rolls, nozzles) or lengthy machine down-time such as for replacing nozzles whenever sputtering occurs. With the use of the tackified APAO adhesive composition, burn-through is minimized while maintaining component attachment strengths at current process conditions.

One particular type of substrate that is particularly well bonded with the tackified APAO adhesive composition with reduced burn-through is a water-vapor-transmissible modified resin film material. More particularly, the modified resin film material may be a film and nonwoven laminate material made by thermally laminating the film and nonwoven materials. The film material may be a multilayered structure made by coextruding a core layer with a skin layer on the outside of the film. The core layer may be a linear low density polyethylene (LLDPE) polymer with two melting transitions at about 97 degrees Celsius and 107 degrees Celsius measured using differential scanning calorimetry (DSC). The core layer may also contained calcium carbonate filler particles in the size range of about 0.1-10 microns at about 50% by weight of the layer. The skin layer may be composed of a 50:50 blend of polypropylene and ethylene vinyl acetate polymer with a 14% vinyl acetate content in the blend. The skin layer on either side of the core layer may be present at about 2% by weight of the total film. The nonwoven material in the laminate may be composed of polypropylene spunbond made up of fibers with diameter of about 10 microns or greater. The basis weight of the spunbond may be about 0.3 osy or greater and may be thermally laminated to the film. Prior to laminating the film to the nonwoven, the film may be stretched to create a porous structure to render the film breathable. The multilayered film may have a thickness of about 20 microns.

One characteristic of such a film material is adhesive temperature sensitivity during converting processes, such as diaper converting processes, due to a lower melting point component of the resin. With the modified resin film material, in particular, it was discovered that the tackified APAO adhesive composition is able to reduce the tendency for film burn-through without modification of adhesive add-on level, application temperature, or other processing changes. The compatibility of the tackified APAO adhesive composition and the modified resin film material is illustrated in Example 3 below.

The bonded structures of the invention can be incorporated into any suitable article, such as personal care products, health/medical products, and household/industrial products. More particularly, the bonded structures are suitable for use in absorbent articles such as diapers, diaper pants, baby wipes, training pants, absorbent underpants, child care pants, swimwear, and other disposable garments; feminine care products including sanitary napkins, wipes, menstrual pads, panty liners, panty shields, tampons, and tampon applicators; adult-care products including wipes, pads, containers, incontinence products, and urinary shields; clothing components; athletic and recreation products; products for applying hot or cold therapy, medical gowns (i.e., protective and/or surgical gowns), surgical drapes, caps, gloves, face masks, bandages, wound dressings, wipes, covers, containers, filters, disposable garments and bed pads, medical absorbent garments, underpads; construction and packaging supplies, products for cleaning and disinfecting, wipes, covers, filters, towels, bath tissue, facial tissue, nonwoven roll goods, home-comfort products including pillows, pads, cushions, masks and body care products such as products used to cleanse or treat the skin, laboratory coats, cover-alls, and the like.

In yet another aspect, an article may include one or more bonded structures of the invention. For ease of explanation, the article will be described in terms of a diaper, as illustrated in FIGS. 1 and 2.

The diaper 120 includes a chassis 132. The chassis 132 defines a front region 122, a back region 124, a crotch region 126 interconnecting the front and back regions, a body-contacting surface 128 which is configured to contact the wearer, and an outer surface 130 opposite the body-contacting surface which is configured to contact the wearer's clothing. The front region 122 is contiguous with a front waist edge 138, and the back region 124 is contiguous with a back waist edge 139.

The diaper 120 includes an outer cover 140, a body side liner 142 which is connected to the outer cover in a superposed relation, and an absorbent assembly (not shown) which is positioned or located between the outer cover 140 and the body side liner 142. The bonded structure may be the attachment of the outer cover 140 to the body side liner 142, such as in a waist region and/or around leg openings 152 of the diaper 120. The diaper 120 may also include a pair of side panels 160 attached to the outer cover 140 and/or the body side liner 142. These side panels 160 can be tabs, straps, tearable seams, or similar devices that can be fastened between the front region 122 and the back region 124 by suitable means, including adhesives. The side panels 160 can be elasticized to provide an elastically extensible feature that provides a more comfortable and contouring fit and more effective application of the diaper. The attachment of the side panels 160 to the outer cover 140 using tackified APAO adhesive composition may be another example of the bonded structure.

Figure 2:
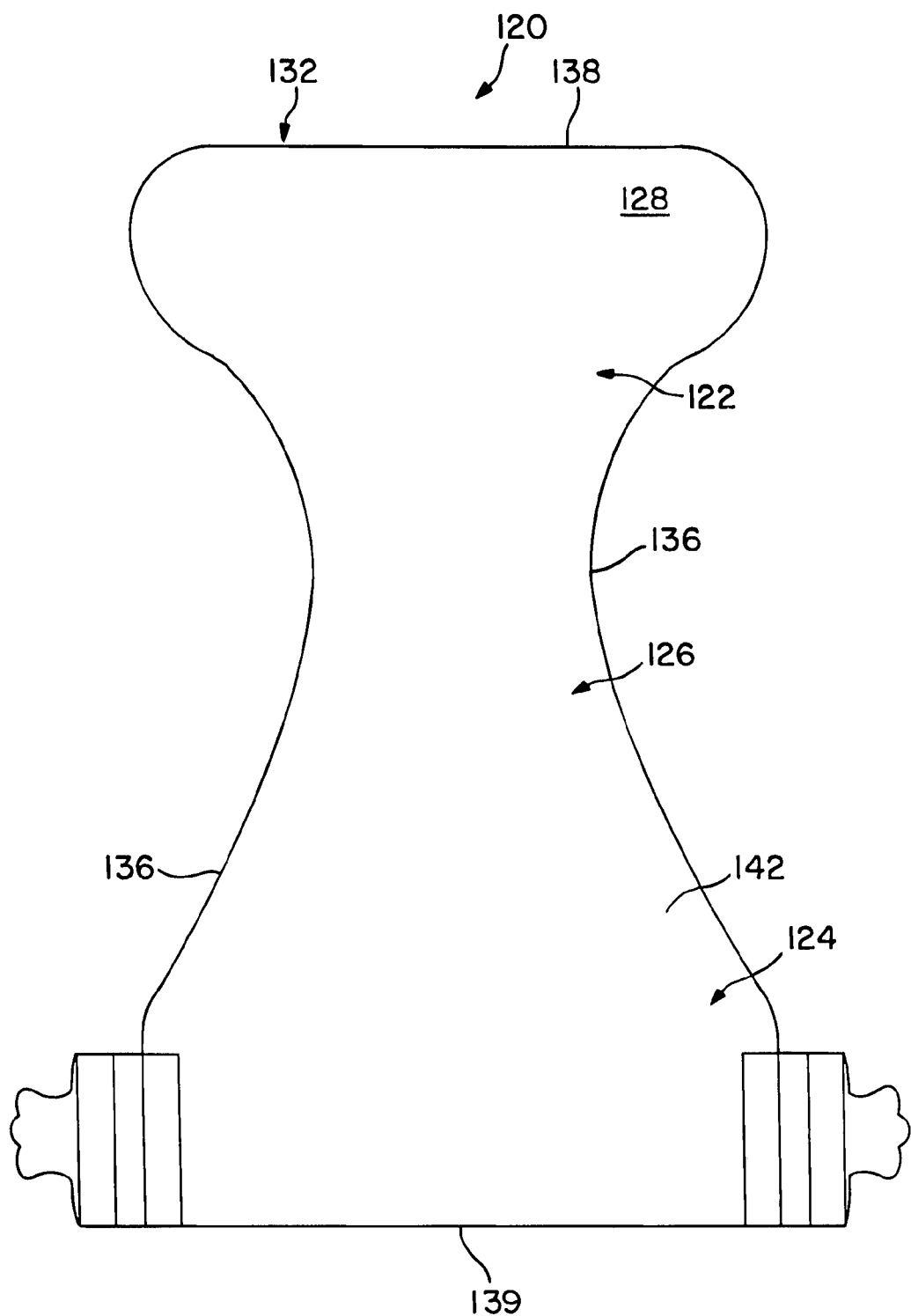
FIG. 2 is a plan view of an article including at least one bonded structure, with the article in a stretched flat state and showing the body-contacting surface of the article.

As shown in the diaper 120 in FIG. 1, the front and back regions 122 and 124 together define a three-dimensional pant configuration having a waist opening 150 and a pair of leg openings 152. The waist edges 138 and 139 of the absorbent chassis 132 are configured to encircle the waist of the wearer when worn and provide the waist opening 150 which defines a waist perimeter dimension. Portions of the transversely opposed side edges 136 of the chassis 132 in the crotch region 126 generally define the leg openings 152. The front region 122 includes the portion of the diaper 120 which, when worn, is positioned on the front of the wearer while the back region 124 includes the portion of the diaper which, when worn, is positioned on the back of the wearer. The crotch region 126 of the diaper 120 includes the portion of the diaper which, when worn, is positioned between the legs of the wearer and covers the lower torso of the wearer. The side panels 160 of the diaper 120, when worn, are positioned forward from the hips of the wearer.

The chassis 132 is configured to contain and/or absorb any body exudates discharged from the wearer. For example, the absorbent chassis 132 can include a pair of elasticized containment flaps (not shown) which are configured to provide a barrier to the transverse flow of body exudates. The elasticized containment flaps define an unattached edge which assumes an upright, generally perpendicular configuration in at least the crotch region 126 of the diaper 120 to form a seal against the wearer's body. Suitable constructions and arrangements for the containment flaps are generally well known to those skilled in the art and are described in U.S. Pat. No. 4,704,116 issued Nov. 3, 1987 to Enloe, which is incorporated herein by reference. The attachment of containment flaps to the outer cover 140 and/or body side liner 142 using tackified APAO adhesive composition may be yet another example of the bonded structure.

To further enhance containment and/or absorption of body exudates, the diaper 120 can include waist elastic members 157 and/or leg elastic members 158, as are known to those skilled in the art (FIG. 1). The waist elastic members 157 can be operatively joined to the outer cover 140 and/or the body side liner 142 along the opposite waist edges 138 and 139, and can extend over part or all of the waist edges. The leg elastic members 158 are desirably operatively joined to the outer cover 140 and/or the body side liner 142 longitudinally along the, opposite side edges 136 and positioned in the crotch region 126 of the diaper 120. The attachment of the waist elastic members 157 and/or the leg elastic members 158 to the chassis 132 using tackified APAO adhesive composition may be still another example of the bonded structure.

The outer cover 140 desirably includes a material that is substantially liquid-impermeable, and can be elastic, stretchable or nonstretchable. The outer cover 140 can be a single layer of liquid-impermeable material, but desirably includes a multi-layered laminate in which at least one of the layers is liquid-impermeable. For instance, the outer cover 140 can include a liquid-permeable layer and a liquid-impermeable layer that are laminated to one another. The liquid-permeable layer can be any suitable material and desirably one that provides a generally cloth-like texture. One example of such a material is a 20 gsm (grams per square meter) spunbond polypropylene nonwoven web. The liquid-permeable layer may also be made of those materials of which liquid-permeable body side liner 142 is made. While it is not a necessity for the outer cover 140 to include a liquid-permeable layer, it may be suitable to include a layer that provides a relatively cloth-like texture to the wearer.

One or more layers of the outer cover 140 can be both liquid and vapor-impermeable, or can be liquid-impermeable and vapor-permeable. A liquid-impermeable layer may be manufactured from a thin plastic film, although other flexible liquid-impermeable materials may also be used. The liquid-impermeable layer, or the liquid-impermeable outer cover 140 when a single layer, prevents waste material from wetting articles, such as bedsheets and clothing, as well as the wearer and care giver. A suitable liquid-impermeable film for use as a liquid-impermeable layer, or a single layer liquid-impermeable outer cover 140, is at least 0.01 millimeter thick polyethylene film commercially available from Huntsman Packaging of Newport News, Va., U.S.A. If the outer cover 140 is a single layer of material, it can be embossed and/or matte finished to provide a more cloth-like appearance. As earlier mentioned, the liquid-impermeable material can permit vapors to escape from the interior of the disposable absorbent article, while still preventing liquids from passing through the outer cover 140. A suitable "breathable" material is composed of a microporous polymer film or a nonwoven fabric that has been coated or otherwise treated to impart a desired level of liquid impermeability. A suitable microporous film is a PMP-1 film material commercially available from Mitsui Toatsu Chemicals, Inc., Tokyo, Japan, or an XKO-8044 polyolefin film commercially available from 3M Company, Minneapolis, Minn., or any of the materials described in U.S. Pat. No. 6,075,179 issued to McCormack, et al., which is hereby incorporated by reference in its entirety in a manner consistent with the present document.

The liquid-permeable body side liner 142 is illustrated as overlying the outer cover 140 and absorbent assembly, and may but need not have the same dimensions as the outer cover 140. The body side liner 142 is desirably compliant, soft feeling, and non-irritating to the wearer's skin. Further, the body side liner 142 can be less hydrophilic than the absorbent assembly, to present a relatively dry surface to the wearer and permit liquid to readily penetrate through its thickness.

The body side liner 142 can be manufactured from a wide selection of web materials, such as synthetic fibers (for example, polyester or polypropylene fibers), natural fibers (for example, wood or cotton fibers), a combination of natural and synthetic fibers, porous foams, reticulated foams, reticulated thermoplastic films, apertured formed thermoplastic films, apertured plastic films, hydroformed thermoplastic films, thermoplastic scrims, or the like. Various woven and nonwoven fabrics can be used for the body side liner 142. For example, the body side liner 142 can be composed of a meltblown or spunbonded web of polyolefin fibers. The body side liner 142 can also be a bonded-carded web composed of natural and/or synthetic fibers. The body side liner 142 can be composed of a substantially hydrophobic material, and the hydrophobic material can, optionally, be treated with a surfactant or otherwise processed to impart a desired level of wettability and hydrophilicity. Additionally, the body side liner 142 can be treated with lotion or ointment for skin health.

The absorbent assembly can be positioned or located between the outer cover 140 and the body side liner 142, which components can be joined together by any suitable means, such as adhesives, as are well known in the art. More particularly, the absorbent assembly can be joined with the outer cover 140, the body side liner 142, or both. Alternatively, portions of the entire absorbent assembly may be unattached to either the outer cover 140, the body side liner 142, or both. For example, the outer cover 140 and/or the body side liner 142 may be secured to the absorbent core or to each other by a uniform continuous layer of adhesive, a patterned layer of adhesive, or an array of separate lines, spirals, or spots of adhesive.

The absorbent assembly can be any structure which is generally compressible, conformable, non-irritating to the wearer's skin, and capable of absorbing and retaining liquids and certain body wastes. The absorbent assembly can be manufactured in a wide variety of sizes and shapes, and from a wide variety of liquid absorbent materials commonly used in the art. For example, the absorbent assembly can suitably include a matrix of hydrophilic fibers alone, such as a web of cellulosic fluff, or a mixture of both hydrophilic and hydrophobic fibers, or the fibers can be mixed with particles of a high-absorbency material commonly known as superabsorbent material. The absorbent assembly can also include other absorbent components that are often used in absorbent articles, such as a dusting layer, a wicking or acquisition layer, or a secondary topsheet. In a particular embodiment, the absorbent assembly includes a matrix of cellulosic fluff, such as wood pulp fluff, and superabsorbent hydrogel-forming particles. The wood pulp fluff can be exchanged with synthetic, polymeric, meltblown fibers or with a combination of meltblown fibers and natural fibers. The superabsorbent particles can be substantially homogeneously mixed with the hydrophilic fibers or can be nonuniformly mixed. The fluff and superabsorbent particles can also be selectively placed into desired zones of the absorbent assembly to better contain and absorb body exudates. The concentration of the superabsorbent particles can also vary through the thickness of the absorbent assembly. Alternatively, the absorbent assembly can include a laminate of fibrous webs and superabsorbent material or other suitable means of maintaining a superabsorbent material in a localized area.

Suitable superabsorbent materials can be selected from natural, synthetic, and modified natural polymers and materials. The superabsorbent materials can be inorganic materials, such as silica gels, or organic compounds, such as crosslinked polymers. Suitable superabsorbent materials are available from various commercial vendors, such as Dow Chemical Company located in Midland, Mich., U.S.A., and Stockhausen Inc. in Greensboro, N.C., U.S.A. Typically, a superabsorbent material is capable of absorbing at least about 10 times its weight in physiological saline, and desirably is capable of absorbing more than about 25 times its weight in physiological saline.

The chassis 132 can also incorporate other materials that are designed primarily to receive, temporarily store, and/or transport liquid along the mutually facing surface with the absorbent assembly, thereby maximizing the overall absorbent capacity of the absorbent assembly, if desired. One suitable material is referred to as a surge layer (not shown) and includes a material having a basis weight of about 50 to about 120 grams per square meter (gsm), and including a through-air-bonded-carded web of a homogenous blend of 60 percent 3 denier type T-256 bicomponent fiber including a polyester core/polyethylene sheath and 40 percent 6 denier type T-295 polyester fiber, both commercially available from Kosa Corporation of Salisbury, N.C., U.S.A. Another example of a suitable surge layer may include a material made of 6 denier polyethylene terephthalate (PET) and 6 denier bicomponent binder fiber, having a basis weight of about 50 to about 120 gsm.

The various components of the diaper 120, other than the bonded structures, can be integrally assembled together employing various types of suitable attachment means, such as adhesive, ultrasonic, and thermal bonds, or combinations thereof.

In addition to various versions of bonded structures and articles including such bonded structures, the invention also encompasses methods of making bonded structures and articles.

In the process description that follows, the preparation, processing, and application of a tackified APAO adhesive composition including APAO, a tackifier, and an antioxidizing agent is described. It should be understood, however, that this description is given as an example. Other processing methods and equipment may be used to prepare and deliver the adhesive compositions and bonded structures of the invention.

One version of a method of making a bonded structure having features of the invention includes the steps of providing a first facing layer or substrate; providing a second facing layer or substrate; providing an APAO and a tackifier; heating the APAO and the tackifier to about 170 degrees Celsius or less; blending the heated APAO and tackifier to form a tackified APAO adhesive composition that is melt-processable at a temperature of about 170 degrees Celsius or less; applying the tackified APAO adhesive composition to the first substrate, the second substrate, or both substrates; and joining at least a portion of the first substrate to at least a portion of the second substrate so that some or all of the applied tackified APAO adhesive composition is positioned between the first substrate and second substrate.

It should be understood that the APAO and the tackifier, plus any additives such as an antioxidizing agent, could be heated and blended at a site other than the site where the bonded structure is being formed. For example, the APAO and the tackifier could be blended using an extruder or hot-melt processing equipment at a first geographic location. The blend could then be allowed to cool and processed to make a solid form (e.g., pellets). The polymer blend, in solid form, could then be shipped from the first geographic site to a site where a bonded structure is to be made. The blend, in solid form, would simply be heated to substantially liquefy the tackified APAO adhesive composition prior to its being used to make a bonded structure.

It should also be understood that a method having features of the invention encompasses different sequences of steps by which the tackified APAO adhesive composition is made. For example, the APAO could be heated and the tackifier could be added subsequent to heating the APAO. Alternatively, the APAO and the tackifier could be combined prior to heating. The preceding discussion assumes that the APAO is in substantially solid form at room temperature, or temperatures that are typically present in a working environment suitable for human beings.

Figure 3:
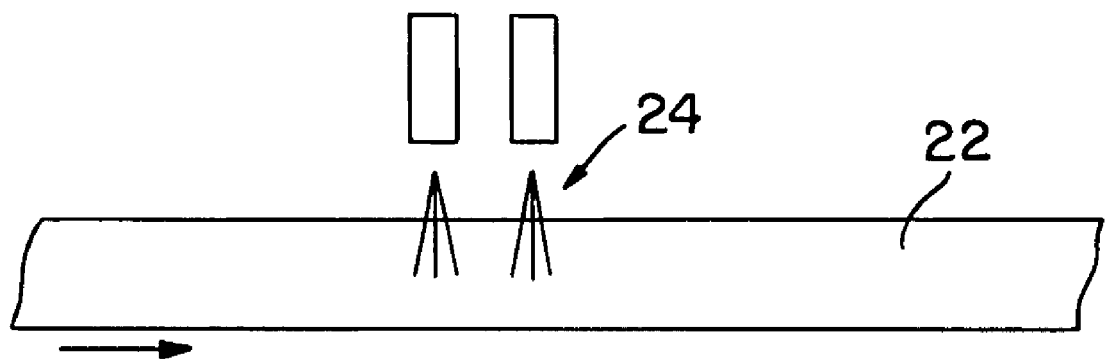
FIG. 3 shows a schematic diagram of one version of a method and apparatus for preparing, processing, and delivering an adhesive composition.

As representatively illustrated in FIG. 3, a first substrate, such as a continuously moving web 22, may be supplied by any means known to those skilled in the art, such as known conveyor systems. The continuously moving web 22 can include any type of layer or web of material, such as: films; nonwoven webs; woven webs which may include strands of thermoplastic material; an elasticized component; natural material such as threads of cotton and the like; laminate materials; or combinations thereof. More particularly, the continuously moving web 22 may include a necked-bonded laminate ("NBL"), which generally comprises an elastic film layer sandwiched between two polypropylene, spunbonded layers; a polypropylene, spunbonded layer ("SB"); or an outercover comprising a polyolefin film layer and a polypropylene spunbonded layer. The tackified APAO adhesive 24 is applied to the continuously moving web 22, such as by swirl-spraying, slot-coating, melt-spraying, for subsequent placement of or bonding to another material. The other material can be the same or different than the web to which adhesive was applied. In some cases adhesive might be applied to both substrates before they are joined together. And, as mentioned above, one substrate might be folded over and attached to itself to form a bonded structure.

After the adhesive 24 has been applied to the moving web 22, the web may be further processed in a variety of ways. For example, the continuously moving web 22 may be contacted by a second substrate web, such as a nonwoven layer, between a pair of nip rolls to adhesively join the two substrate webs together. Thereafter, this bonded structure may be used in a variety of ways such as in the construction of disposable absorbent articles such as diapers, incontinent articles, training pants, feminine care articles and the like.

The above discussion provides one example of hot-melt processing equipment and a system for applying tackified APAO adhesive to a substrate. It should be understood that this is but one example, and that the invention encompasses other systems for preparing and applying adhesives (see, e.g., U.S. Pat. No. 4,949,668, entitled "Apparatus for Sprayed Adhesive Diaper Construction," which issued on 21 Aug. 1990, and which is hereby incorporated by reference in its entirety and in a manner consistent with the invention).

Regardless of the system used to apply the tackified APAO adhesive composition, the resulting bonded structure may be exposed to thermal, infrared, ultrasonic, or other forms of energy in subsequent unit operations or processing steps.

Test Methods

Dynamic Peel Strength Testing

Figure 4:
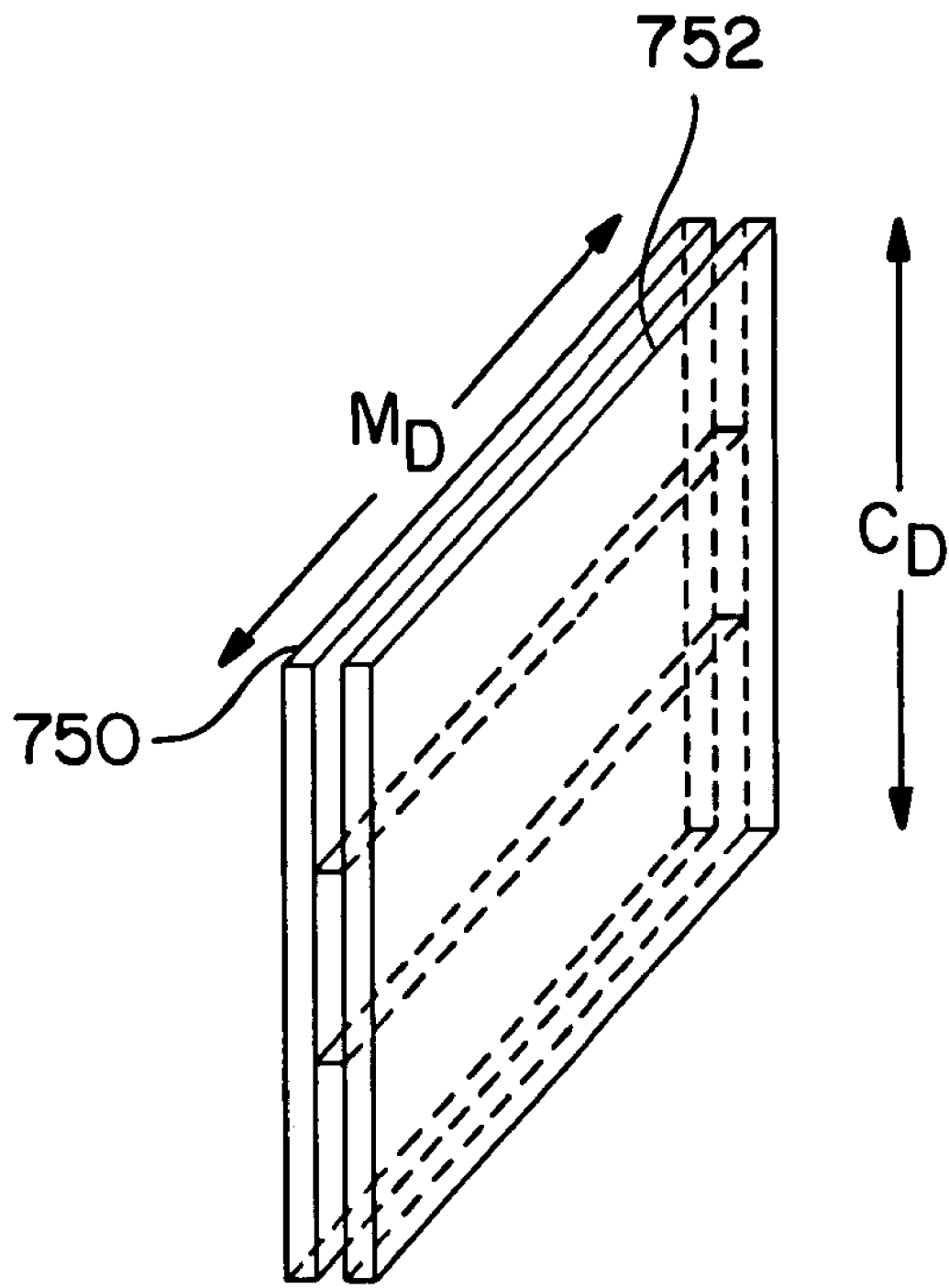
FIG. 4 shows a plan view of one version of a bonded structure during dynamic peel strength testing.

To determine dynamic peel strength, a bonded structure was tested for the maximum amount of tensile force that was needed to pull apart the layers of the bonded structure. Values for peel strength were obtained using a specified width of substrate (for the present application, 3 inches); clamp jaw width (for the present application, a width greater than 3 inches); and a constant rate of extension (for the present application, a rate of extension of 250 millimeters per minute). Both sides of the specimen are covered with masking tape, or some other suitable material, in order to prevent the substrates from tearing during the test. The masking tape does not significantly contribute to the peel strength of the sample. This test uses two clamps, each clamp having two jaws with each jaw having a facing in contact with the sample, to hold the material in the same plane, usually vertically. The sample size is 3 inches (7.62 cm) wide by at least 4 inches (10.16 cm) long. The jaw facing size is 0.5 inch (1.27 cm) high by at least 3 inches (7.62 cm) wide, and the constant rate of extension is 250 mm/min. For a dynamic peel test, one clamp is attached to the top 750 of one substrate of a test panel (see FIG. 4). The other clamp is attached to the top 752 of the other substrate of a test panel. During testing, one clamp moves away from the other at the specified rate of extension to pull apart the bonded structure. The sample specimen is pulled apart at 180 degrees angle of separation between the two layers, and the peel strength reported is the maximum tensile strength, in grams, recorded during the test. Each of the peel strengths reported below is an average of five to ten tests. A suitable device for determining the peel strength is a SINTECH 2 tester, available from the Sintech Corporation, a business having offices at 1001 Sheldon Dr., Cary, N.C. 27513; or an INSTRON Model™, available from the Instron Corporation, a business having offices at 2500 Washington St., Canton, Mass. 02021; or the Thwing-Albert Model INTELLECTII available from the Thwing-Albert Instrument Co., a business having offices at 10960 Dutton Rd., Philadelphia, Pa. 19154.

This test method is similar to ASTM D1876-01, with one difference being the width of the substrate. Additionally, bonded samples were conditioned for a minimum of 24 hours, versus 7 days in ASTM D1876-01. Furthermore, in the Dynamic Peel Strength Testing used herein, the bonded substrates were backed with flexible masking tape (such as TARTAN® 200, available from Minnesota Mining & Manufacturing Co., St. Paul, Minn.) to assure adhesive, rather than substrate, failure.

End Seal Strength Testing

A constant rate of extension (CRE) tensile tester is used to determine the end seal strength, namely the cohesive and adhesive strength, of a bonded structure such as an outer cover bonded to a body side liner of a diaper. The peak load values are given in grams-force. Sample diapers are prepared by fully stretching the waist area (in the cross-machine direction) so that it is flat. While in a flat state, place a cutting template on the waist region of the diaper such that it is centered on the longitudinal centerline of the diaper and one end of the long dimension is lined up with the end of the diaper. The template is used to mark a 76.2 mm wide and 127 mm long area. Mark the diaper for cutting of the sample that is used for testing. The cut will be 76.2 mm wide and extend 127 mm into the diaper. Using scissors or any other appropriate cutting tool, remove the sample from the diaper. Carefully remove any of the absorbent core material without disturbing the end seal. Using a CRE tester, center the specimen to be tested in the grips with the outer cover clamped in the moving grip, the body side liner clamped in the stationary grip, and the inside (absorbent core) facing the front of the tensile tester. The line of separation between the outer cover and the liner should be approximately centered between the top and bottom grip. The test parameters are: crosshead speed (254 mm/min), gage length (101.6 mm), test results (peak load in grams-force). Start the crosshead. When the test has finished, record the peak load to the nearest 0.1 grams-force. For convenience, the results may also be reported in grams-force per 25.4 mm of width by dividing the results by 3.

Burn-Through Rating

Figure 5:
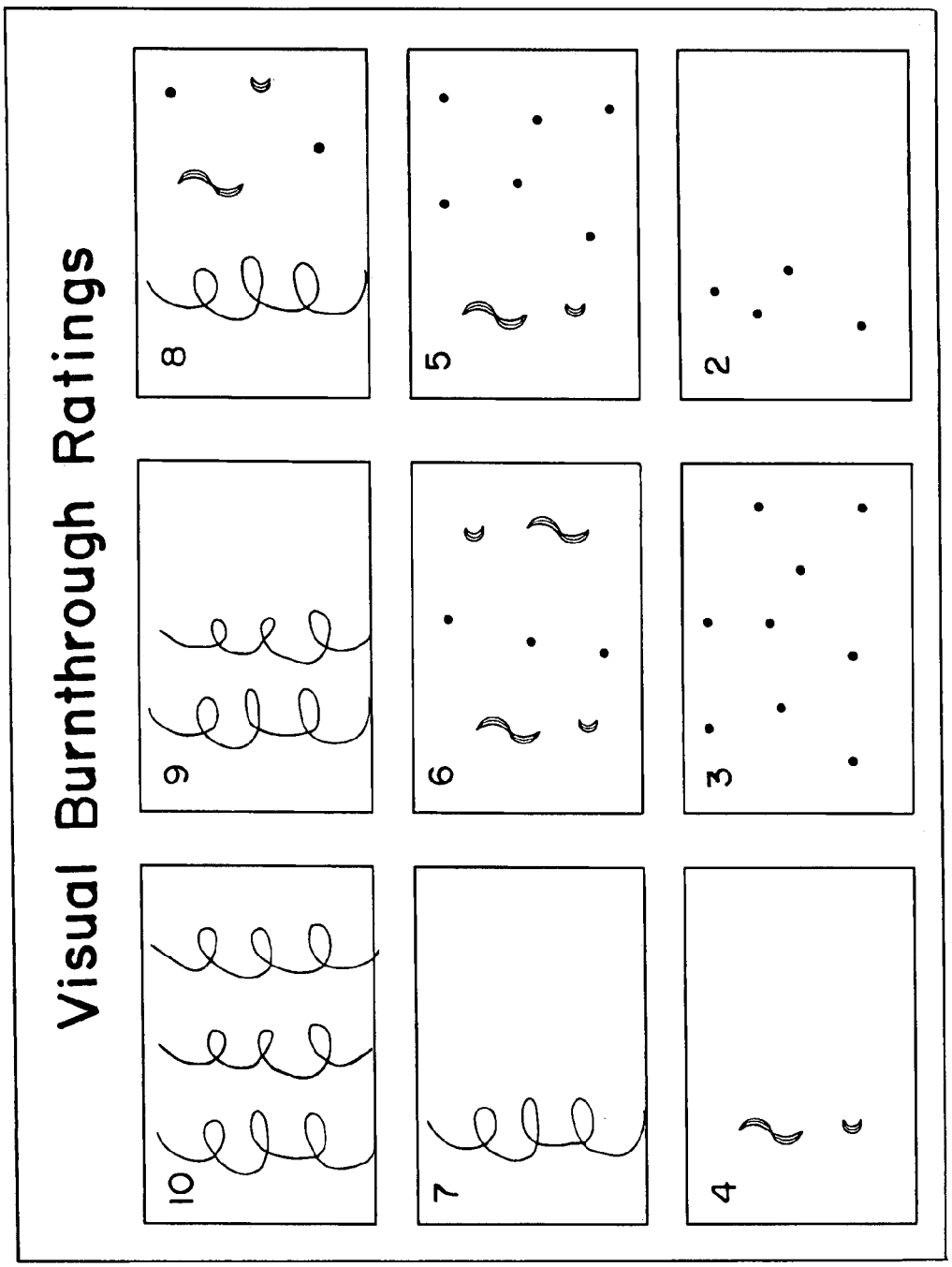
FIG. 5 shows a visual chart of burn-through ratings, described in further detail in the Burn-Through Ratings portion of the Test Methods section.

Burn-through can be determined by a qualitative comparison to a series of visual standards which typify a range of burn-through from none to complete. This can be done with an integer scale from 1 to 10, with increasing values denoting increasing burn-through. FIG. 5 is a visual chart illustrating each burn-through rating. An illustration of a "1" rating is not included, because "1" is equivalent to no burn-through. An illustration of no burn-through would be a non-marred surface. Verbal descriptions of burn-through ratings 2-10 are as follows:

2—small (about 1 mm or less) film imperfections in a single lane

3—small (about 1 mm or less) film imperfections across multiple lanes

4—medium (greater than 1 mm) film imperfections in a single lane

5—medium (greater than 1 mm) film imperfections in a single lane with small imperfections in other lanes 6—medium (greater than 1 mm) film imperfections across multiple lanes 7—continuous film burn-through in a single lane 8—continuous film burn-through in a single lane with small or medium film imperfections in other lane(s)

9—continuous film burn-through across multiple lanes

10—continuous film burn-through across all lanes

A "lane" is an approximately 25 mm width section of the surface along the length of a sample of a bonded structure. Alternatively, a "lane" may be a stripe along a length of the sample, wherein the stripe has a width that is approximately 10% of the total width of the sample.

Compression-Tensile Texture Analyzer Test Method

The Texture Analyzer is a computer-controlled precision compression-tensile instrument manufactured by Stable Microsystems located in Godalming, Surrey, England. Software to run the Texture Analyzer is produced by Texture Technologies Corp. located in Scarsdale, N.Y. The Texture Analyzer is used to measure controlled distance or penetration within an adhesive film.

Generate an adhesive film by draw-down of molten adhesive onto kraft paper through a fixed gap at ~0.1 meters/sec to produce a uniform 1 mil (0.025 mm) thick adhesive film.

Attach polyethylene or polypropylene test film to the oblong aluminum probe using double-faced masking tape, such as product number 406-2252-001 available from Minnesota Mining & Manufacturing Co., St. Paul, Minn., or an equivalent product. The film contact area should be approximately 2.7 mm by 12.8 mm, as defined by the rectangular probe surface.

The Texture Analyzer should be configured for the film-surfaced probe to contact and penetrate the film 0.1 mil (0.0025 mm) at a rate of 0.1 mm/sec into a 1 mil (0.025 mm) thick layer of adhesive held at a temperature of 34 degrees Celsius. The film surfaced probe should be held in that contact position for 40 seconds. The probe is then retracted at a rate of 5 mm/sec to measure bond strength. Data acquisition should be 200 points/sec.

In general, the film-to-adhesive bonded area should approach the available probe film surface area. The actual contact surface area is quantified by microscopic analysis at 25× utilizing the film imprint remaining in the adhesive after separation and this area is used with the force to separate the film from the adhesive to calculate the reported bond force/mm.

A minimum of six samples is tested for each film-adhesive combination.

EXAMPLES

Example 1

This example demonstrates the improved compression-tensile peel strength of tackified APAO onto a multiplicity of polyethylene and polypropylene surfaced films compared to neat APAO and formulated SBC (styrene block copolymer) adhesives. Twenty-one different bonded structures were compared with each of the adhesive types—SBC, APAO, and tackified APAO—bonded onto seven different polyolefin substrates. The SBC adhesive EASYMELT® 34-5610, available from National Starch & Chemical of Bridgewater, N.J. The APAO adhesive was a propylene-1-butene copolymer, RT2723, from Huntsman Polymer Corporation. The tackified APAO adhesive was formulated from 80% RT2730 APAO adhesive from Huntsman Polymer Corporation, 20% ESCOREZ™ 5320 tackifier from Exxon-Mobil, and 0.8% IRGANOX™ 1010 hindered phenol/phosphite antioxidant stabilizer from Ciba Specialty Chemicals. The seven polyolefin substrates included a polypropylene substrate and six different polyethylene films representing a range of high density, low density, linear low density, metallocene catalyzed polyethylene films, and blends of these four polyethylene polymer types.

A Texture Analyzer, manufactured by Stable Microsystems, England, was used to measure the compression-tensile peel strength of all 21 bonded structures, in accordance with the Compression-Tensile Texture Analyzer Test Method described herein. Results are shown in Table 1. Table 1 also includes the averages of all polyethylene substrate values.

TABLE 1

Compression-Tensile Peel Strength of Bonded Structures (g/mm²)

| Adhesive | PE 1 | PE 2 | PE 3 | PE 4 | PE 5 | PE 6 | PE Ave | PP |
|---|---|---|---|---|---|---|---|---|
| SBC | 38 | 43 | 42 | 41 | 32 | 31 | 38 | 68 |
| APAO | 102 | 87 | 79 | 86 | 64 | 68 | 81 | 101 |
| t-APAO | 108 | 113 | 88 | 119 | 97 | 106 | 105 | 121 |

Several of the films in Table 1 and one additional film (PE7) were used to form bonded structures with 0.6 osy polypropylene spunbond using each of the three types of adhesives, by either swirl spray application at 3 gsm and/or by meltblown application at 3 gsm, and were subsequently tested for dynamic peel strength. Results are shown in Tables 2 and 3.

TABLE 2

Dynamic Peel Strength of Swirl Spray Bonded Structures (g/25 mm)

| Adhesive | PE3 | PE6 | PE7 | PP |
|---|---|---|---|---|
| SBC | 107 | 113 | 315 | 267 |
| APAO | 57 | 182 | 244 | — |
| t-APAO | 240 | 373 | 491 | 520 |

TABLE 3

Dynamic Peel Strength of Meltblown Bonded Structures (g/25 mm)

| Adhesive | PE1 | PE2 | PE3 | PE5 | PP |
|---|---|---|---|---|---|
| SBC | 208 | 87 | 260 | 235 | 455 |
| APAO | 118 | 101 | 155 | 248 | 331 |
| t-APAO | 261 | 191 | 351 | 371 | 519 |

As can be seen in Tables 1, 2, and 3, tackified APAO outperformed both SBC and APAO adhesives in terms of compression-tensile strength and dynamic peel strength for both swirl spray and meltblown bonding.

Example 2

This example demonstrates the dynamic peel strength of one particular tackified APAO adhesive at various adhesive add-on levels.

Tackified APAO, prepared from 80% RT2730 APAO adhesive from Huntsman Polymer Corporation, 20% ESCOREZ™ 5415 tackifier from Exxon-Mobil, and 0.8% IRGANOX™ 1010 hindered phenol/phosphite antioxidant stabilizer from Ciba Specialty Chemicals, was swirl sprayed onto a low density polyethylene blend (PE3) at four add-on levels of 1.5, 2.25, 3.0, and 4.5 gsm, and bonded to 0.6 osy polypropylene spunbond. Corresponding peel strengths are shown in Table 4.

TABLE 4

Adhesive Add-On Correlation to Dynamic Peel Strength

| Adhesive Add-On (gsm) | Dynamic Peel Strength (g/25 mm) |
|---|---|
| 4.5 | 438 |
| 3.0 | 287 |
| 2.25 | 217 |
| 1.5 | 171 |

A linear relationship between adhesive add-on and dynamic peel strength was observed, with a 0.984 correlation coefficient, when the line passed through 0 peel strength at 0 add-on, as illustrated in FIG. 6.

Example 3

This example demonstrates the ability of tackified APAO adhesive to reduce the tendency for film burn-through without requiring any modification of adhesive add-on, temperature, or other processing changes.

In this example, two types of film materials were bonded to 0.485 osy polypropylene spunbond liner material, such as commercially available in ULTRATRIM® diapers manufactured in August 2003 by Kimberly-Clark Corporation of Neenah, Wis., with neat APAO adhesive at various add-on levels.

A "Modified Resin Film" material was a film and nonwoven laminate material made by thermally laminating the film and nonwoven materials. The film material was composed of a multilayered structure made by coextruding a core layer with a skin layer on the outside of the film. The core layer was made of linear low density polyethylene (LLDPE) polymer with two melting transitions at about 97 degrees Celsius and 107 degrees Celsius measured using differential scanning calorimetry (DSC). The core layer also contained calcium carbonate filler particles in the size range of about 0.1-10 microns at about 52% by weight of the layer. The skin layer was composed of a 50:50 blend of polypropylene and ethylene vinyl acetate polymer with a 14% vinyl acetate content in the blend. The skin layer on either side of the core layer was present at about 2% by weight of the total film. The nonwoven material in the laminate was composed of polypropylene spunbond made up of fibers with diameter of about 10 microns or greater. The basis weight of the spunbond was about 0.5 osy and it was thermally laminated to the film. Prior to laminating the film to the nonwoven, the film was stretched to create a porous structure to render the film breathable. The multilayered film had a thickness of about 20 microns. The breathability of the laminate was determined to be about 6000 by measuring the water vapor transmission rate (WVTR) as described by the test method in U.S. Pat. No. 6,638,636 issued to Tucker, which is hereby incorporated by reference in its entirety in a manner consistent with the present document.

A "Control" film material was also a film and nonwoven laminate material made by thermally laminating the film and nonwoven materials. The film material was composed of a multilayered structure made by coextruding a core layer with a skin layer on the outside of the film. The core layer was made of a different LLDPE polymer having one melting transition at about 127 degrees Celsius measured using DSC. The core layer also contained calcium carbonate filler particles in the size range of about 0.1-10 microns at about 46% by weight of the layer. The skin layer was composed of a 50:50 blend of polypropylene and ethylene vinyl acetate polymer with a 14% vinyl acetate content in the blend. The skin layer on either side of the core layer was present at about 2% by weight of the total film. The nonwoven material in the laminate was composed of polypropylene spunbond made up of fibers with diameter of about 10 microns or greater. The basis weight of the spunbond was about 0.5 osy and it was thermally laminated to the film. Prior to laminating the film to the nonwoven, the film was stretched to create a porous structure to render the film breathable. The multilayered film had a thickness of about 20 microns. The breathability of the laminate was determined to be about 1500 by measuring the WVTR.

The onset of the melting transition for the LLDPE was 106 degrees Celsius for the control material with a peak melting temperature at 127 degrees Celsius. Similarly, for the modified resin film material, the onset of the melting transition in the LLDPE was at 58 degrees Celsius with peak melting temperatures at 97 degrees Celsius and 107 degrees Celsius.

The samples were tested to compare adhesive burn-through and end seal strength of the films. Burn-through testing was carried out according to the Burn-Through Rating method described herein, and end seal strength was carried out by according to the End Seal Strength Test Method described herein. The film with modified resin displayed adhesive temperature sensitivity during diaper machine converting due to a lower melting point component of the resin.

Samples of the modified resin film material were then bonded at corresponding add-on levels with the tackified APAO described in Example 1. A comparison of the burn-through results and end seal strengths of the neat APAO adhesive versus the tackified APAO adhesive is provided in Table 5 below.

TABLE 5

Burn-Through Data

| Add-on (gsm) | Control Film Neat APAO Adhesive | | Modified Resin Film Neat APAO Adhesive | | Modified Resin Film Tackified APAO Adhesive | |
|---|---|---|---|---|---|---|
| | Burn-through Rating | End Seal Strength (g/76.2 mm) | Burn-through Rating | End Seal Strength (g/76.2 mm) | Burn-through Rating | End Seal Strength (g/76.2 mm) |
| 4.3 | — | — | 6 | 757 | 5 | 1093 |
| 3.1 | 3.5 | 891 | 6 | 681 | 3.5 | 884 |
| 2.8 | — | — | 5 | 773 | 3 | 867 |
| 2.5 | — | — | 5 | 621 | 3 | 849 |
| 2.2 | — | — | 3.5 | 567 | 2 | 790 |
| 1.9 | — | — | 3.5 | 650 | 2 | 781 |
| 1.6 | — | — | 2.5 | 528 | 1 | 689 |
| 1.2 | — | — | 2.5 | 516 | 1 | 551 |

The highlighted cells in Table 5 indicate acceptable performance for burn-through (visual rating of 3 or less) and end seal strength (at least 750 g/76.2 mm width). With neat APAO adhesive at 3.1 gsm add-on, burn-through increases significantly when the film with modified resin is used. To reduce burn-through, the amount of neat APAO adhesive must be reduced to levels where end seal strength becomes unacceptable. As shown in Table 5, when tackified APAO adhesive is used in combination with the film with modified resin, burn-through and end seal strength are acceptable at the 1.9 through 3.1 gsm adhesive add-on levels. In addition, adhesive amounts can be further reduced to improve burn-through while maintaining acceptable end seal strength. The boxed area in Table 5 indicates the results of the most suitable range of add-on levels of the tackified APAO with the film with modified resin in this example.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A bonded structure comprising:
a first substrate;
a second substrate; and
an adhesive composition bonding the first substrate and the second substrate to one another at an add-on level between about 10 and about 15 grams/meter$^2$, wherein the adhesive composition comprises an amorphous poly-alpha-olefin and a tackifier selected from at least one of the group consisting of: petroleum distillates, rosin, rosin esters, and polyterpenes, and the bonded structure has a dynamic peel strength between about 150 and about 1000 grams per 25 millimeters.

2. The bonded structure of claim 1, having a compression-tensile peel strength between about 80 and about 400 grams per square millimeter.

3. The bonded structure of claim 1, wherein the amorphous poly-alpha-olefin comprises propylene copolymerized with at least one of the group consisting of: butene, ethylene, and hexene.

4. The bonded structure of claim 1, wherein the amorphous poly-alpha-olefin comprises a polypropylene-1-butene amorphous poly-alpha-olefin.

5. The bonded structure of claim 1, wherein the adhesive composition comprises between about 50% and about 99% by weight amorphous poly-alpha-olefin and between about 1% and about 50% by weight tackifier.

6. The bonded structure of claim 1, wherein the tackifier comprises a C5 hydrocarbon tackifier.

7. The bonded structure of claim 1, wherein the adhesive composition consists essentially of the amorphous poly-alpha-olefin, the tackifier, and an antioxidant stabilizer.

8. The bonded structure of claim 7, wherein the antioxidant comprises about 1% or less by weight of the adhesive composition.

9. The bonded structure of claim 1, wherein at least one of the first and second substrates has a thickness of about 40 μm or less.

10. The bonded structure of claim 9, wherein at least one of the first and second substrates has a thickness of about 5 μm to about 20 μm.

11. The bonded structure of claim 1, having no burn-through visual defects greater than about 1 millimeter.

12. The bonded structure of claim 1, wherein at least one of the first and second substrates comprises a low-surface-energy olefin substrate.

13. The bonded structure of claim 12, wherein the low-surface-energy olefin substrate has a surface tension of less than about 33 dynes/cm.

14. The bonded structure of claim 1, wherein at least one of the first and second substrates comprises a low-tension elastic material.

15. The bonded structure of claim 14, wherein the low-tension elastic material provides about 200 grams per inch or less of force when elongated 20%.

16. The bonded structure of claim 1, wherein at least one of the first and second substrates comprises a liquid-impermeable, water-vapor-transmissible substrate.

17. An article comprising:
a first substrate;
a second substrate;
an adhesive composition bonding the first substrate and the second substrate to one another at an add-on level between about 0.5 and about 25 grams/meter$^2$ thereby forming a bonded structure, wherein the adhesive composition comprises an amorphous poly-alpha-olefin and a tackifier, and the bonded structure has an end seal strength between about 60 and about 600 grams per 25 millimeters, and the article is selected from the group consisting of personal care products, health/medical products, and household/industrial products; and the adhesive composition bonding the first substrate and the second substrate is applied by at least one of the group consisting of melt spraying, slot coating, and swirl patterning.

18. An article comprising:

a film;

a nonwoven web; and an adhesive composition bonding the film and the nonwoven web to one another at an add-on level between about 2 and about 5 grams/meter$^2$ thereby forming a bonded structure, wherein the adhesive composition comprises a polypropylene-1-butene amorphous poly-alpha-olefin and a C5 hydrocarbon tackifier, and the bonded structure has an end seal strength between about 60 and about 600 grams per 25 millimeters, and the article is selected from the group consisting of personal care products, health/medical products, and household/industrial products, wherein the adhesive composition has a Brookfield viscosity between more than 10000 and about 15000 centipoises at 190 degrees Celsius.

19. The bonded structure of claim 1, wherein the tackifier is rosin esters.

20. The article of claim 18, wherein:

the adhesive composition is applied at an add-on level of about 2 grams/meter$^2$; and the bonded structure has a dynamic peel strength between at least about 195 grams per 25 millimeters.

* * * * *

UNITED STATES PATENT AND TRADEMARK OFFICE
CERTIFICATE OF CORRECTION

PATENT NO. : 7,517,579 B2 Page 1 of 1
APPLICATION NO. : 11/879642
DATED : April 14, 2009
INVENTOR(S) : Stephen Michael Campbell et al.

It is certified that error appears in the above-identified patent and that said Letters Patent is hereby corrected as shown below:

Title Page, Item (75) Inventors: Richard D. Schultz, should be --Richard D. Schulz--.

Signed and Sealed this

Sixteenth Day of February, 2010

David J. Kappos
*Director of the United States Patent and Trademark Office*